Patented Oct. 27, 1931

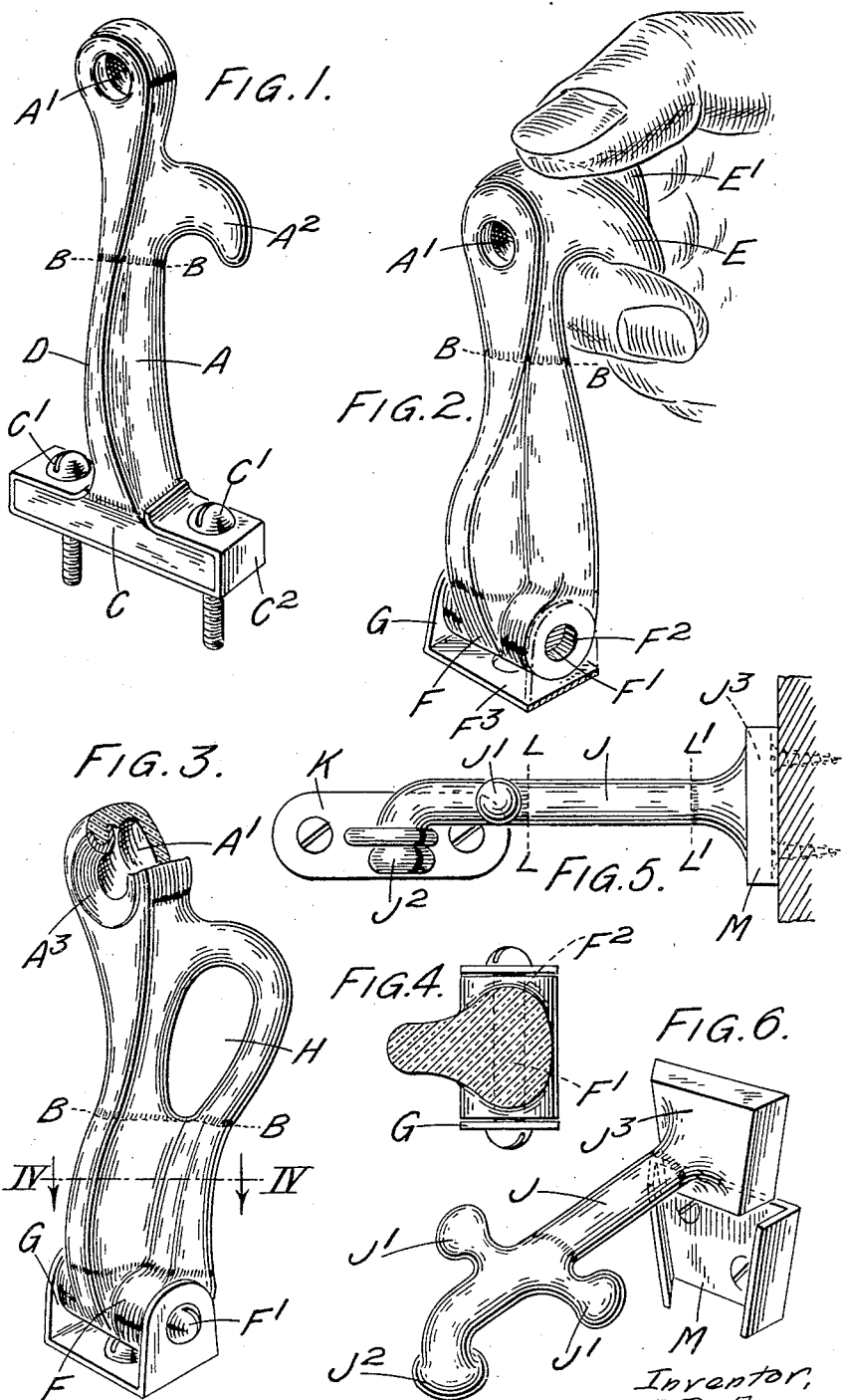

1,829,432

UNITED STATES PATENT OFFICE

THEODORE BERNARD ANDRE, OF LONDON, ENGLAND

FASTENING DEVICE

Application filed October 23, 1929, Serial No. 401,726, and in Great Britain November 16, 1928.

This invention relates to fastening devices and has for its object to provide a device which can be quickly released or engaged, is of simple construction and entirely free from rattle when exposed to vibration whether it is in use or not.

Many attempts have been made to provide a fastening device having the above characteristics, but hitherto such fastenings, for example cabin or like door hooks and the numerous fastening devices or latches used on vehicles—have been of a relatively complicated nature, involving the use of at least two relatively moving parts in addition to springs, rivets or like members to connect these parts together.

According to this invention the entire fastening member is formed as a single unit of india rubber or elastic material some portions of this material being reinforced or hardened as by vulcanization so as not to interfere with the elasticity of the fastener as a whole or with parts of it.

For example, in the case of a hook or like fastening adapted to engage an eye or staple, the hook portion may be vulcanized hard and the opposite end of the fastener, e. g. that part which is secured to a fixed or movable support may be similarly hardened or reinforced, the intermediate portion being elastic and therefore capable of yielding in any direction and free to be stretched or to contract.

Alternatively, a fastening intended to engage a fixed projection or stud may be provided with a reinforced or vulcanized socket or eye, or if provided with a finger grip or like member this may be similarly reinforced or vulcanized, in all cases the fastening device being in the main formed of rubber or like elastic material and having at least one wholly elastic portion.

A fastening device according to this invention entirely dispenses with the need for separate relatively movable parts, joints, pivots or springs, and as the device is unaffected by moisture and incapable of rattling or permitting rattle to occur, whether it is disengaged or connected, it is particularly applicable for use on vehicles, ships or in like conditions. Further, being elastic and therefore capable of yielding in all directions, it need not be attached to its supporting member with the same degree of accuracy as is necessary in the case of a metal fastening device, and although it may be pivotally connected to its support, in some cases such a pivot is not absolutely necessary. The invention is particularly suitable for use with road vehicles either to secure attachments or accessories in place or as a substitute for the metal clips or fastenings usually employed to hold the bonnet in place or to replace the straps used to retain the hood or luggage grid in its folded position.

The invention can be applied to a large class of fastening devices and the constructions illustrated in the accompanying drawings are given merely to illustrate certain typical examples. In these drawings—

Figures 1, 2 and 3 illustrate in perspective three alternative forms of clips or fastening device for the bonnet of a motor vehicle, Figure 4 is a cross-section on the line IV—IV of Figure 3, and Figures 5 and 6 show in side elevation and perspective respectively a cabin hook according to this invention.

The bonnet clip illustrated in Figure 1 is formed wholly of rubber and comprises a shank portion A having at its upper end a socket or recess $A^1$ to engage a projecting stud on the bonnet, not shown. Below the socket and on the opposite side of the clip is a projecting hook or finger grip $A^2$, and the whole of the upper end of the clip above the dotted line B—B is hard vulcanized so that the finger grip and the socket portion of the clip are relatively rigid and non-elastic.

The lower end of the shank merges into an enlarged base C which is also hard vulcanized and which may be provided with a metal sheath such as $C^2$ which is drilled to receive the screws or bolts $C^1$ by which the whole device can be attached to its support. On the inner surface of the shank on the same side as the socket $A^1$ is a buffer D moulded with the clip and formed of relatively soft rubber. When the clip is in use the shank is in tension, the buffer D is in compression and the socket A¹ engages the stud on the bonnet. If desired, the socket A¹ can be replaced by a projecting hook or finger to engage a staple or the like on the bonnet and in this case the projecting hook will be hard vulcanized or otherwise reinforced. If the clip is to be opened, the shank is first extended and then flexed outwards to release the stud and even if it is left unfastened it will not rattle or cause damage to the paintwork of the vehicle.

A slightly modified construction is illustrated in Figure 2 in which the hook E is furnished with a projection E¹ on its upper surface to be engaged by the thumb of the operator. As before, the finger grip and the rubber surrounding the socket are hard vulcanized but in this case instead of the base being rigidly connected as by screws to the chassis or framework of the vehicle, a pivotal connection is provided for the base of the hook. To this end, the lower end F of the hook is provided with a bore hole F² (which, if desired can be reinforced by a sleeve of metal, fabric, fibre or the like) to receive a pivot F¹ by which the hook is secured to the U-shaped metal or like member F³ of the vehicle frame.

In the further modification shown in Figures 3 and 4 an aperture H is formed in the upper part of the clip to serve as a finger grip instead of this finger grip being in the form of a projecting finger as in the previous constructions. In other respects the clip is furnished with a base similar to that last described but it will be appreciated that a hard vulcanized base rigidly attached to the frame as in the case of Figure 1 may if desired be employed. The recess or socket A¹ is shown as having a metal eyelet A³ which can be sprung into place. Such an eyelet or ferrule may be employed in either of the constructions previously described.

Figures 5 and 6 show the invention as applied to a cabin hook which is formed wholly of india rubber and comprises a shank portion J having laterally extending arms J¹, a hook portion J² adapted to engage a staple K and an enlarged hard vulcanized base J³. The shank portion J between the base and the extending arms, i. e. the portion which lies between the lines L—L and L¹—L¹ retains its elastic properties but the extremities of the hook, namely the base J³, the projecting arms J¹ and the hook J², are hard vulcanized. The base J³ is preferably of taper shape and of dovetail cross-section so that it can be made to engage a correspondingly shaped metal or like socket M without the use of screws or the like passing through the vulcanized base. Such a hook is in tension when it engages its eye or staple K and will not rattle or cause any damage if it is left unhooked.

It will be understood that instead of reinforcing or toughening certain parts of the hook or clip by means of additional vulcanization, a core of woven fabric, vulcanized fabric or the like may be employed in certain cases and that the improved fastening may, if desired, be formed on the end of some flexible or elastic strap, the particular constructions described and illustrated being given merely by way of example of some of the many practical applications of the invention.

What I claim as my invention and desire to secure by Letters Patent is:—

1. A fastening device formed wholly of india rubber and comprising an elastic shank, a hard vulcanized head portion adapted to engage a separate complementary member, and a similarly hardened base portion.

2. A fastening device such as a bonnet clip for motor vehicles comprising an elastic shank, a hard vulcanized head portion adapted to engage a projecting member, a hardened finger grip moulded in one with the shank, and a similarly hardened base portion whereby the clip can be mounted on the vehicle.

3. A fastening device formed wholly of india rubber and comprising an elastic shank, a hardened engaging portion, a similarly hardened finger grip and a hardened base shaped to make sliding engagement with a socket of dovetail cross-section.

4. A fastening device formed wholly of india rubber and comprising an elastic shank, a hardened hook-like engaging portion, a similarly hardened finger grip formed integral with the shank, and a hardened base shaped to engage a correspondingly shaped socket.

In testimony whereof I have signed my name to this specification.

THEODORE BERNARD ANDRE.